Jan. 18, 1949. W. K. RIEBER 2,459,453
EXPANDING ARBOR

Filed June 1, 1945 2 Sheets-Sheet 1

INVENTOR.
WILLIAM K. RIEBER,
BY
ATTORNEY.

Jan. 18, 1949.  W. K. RIEBER  2,459,453
EXPANDING ARBOR

Filed June 1, 1945  2 Sheets—Sheet 2

INVENTOR.
WILLIAM K. RIEBER,
BY
ATTORNEY.

Patented Jan. 18, 1949

2,459,453

UNITED STATES PATENT OFFICE 2,459,453

EXPANDING ARBOR

William K. Rieber, Los Angeles, Calif.

Application June 1, 1945, Serial No. 597,113

10 Claims. (Cl. 279—2)

My invention relates in general to arbors for holding work in machine tools, and more particularly to arbors of the expanding type designed to hold the work by internal pressure created by mechanical expansion of the arbor within the work.

A primary function of expanding arbors is to firmly grip the work with a pressure that is not excessive, as they are frequently used to hold fragile tubes which may be distorted when wedged on a tapered arbor. It follows that the expanding force should be readily controllable by the operator and not a matter of jamming wedges, either flat or of the ball or roller type, to a position giving the maximum grip, as such jamming can be very destructive. Expanding arbors heretofore have usually been of the wedge type and have required mounting on a shaft or special tool held by the lathe or grinder in order to give them an object against which to wedge.

It is accordingly a principal object of my invention to provide an expanding arbor capable of exerting a grip readily controllable by the operator.

A further object of the invention is to provide an arbor having resilient gripping parts, whose resiliency is not nullified by the use of wedges.

Another object of my invention is to provide an arbor directly mountable in the chuck or collet of conventional machine tools.

It is also an object to provide an arbor adapted to have stepped diameters capable thereby of gripping a variety of sizes of work.

These and other objects I attain in a manner which will be clear from a consideration of the following description taken in connection with the accompanying drawings, in which.

Figure 1:
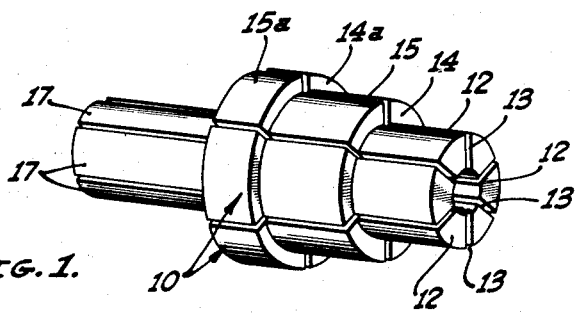
Figure 1 is a perspective view of a preferred embodiment of my invention.
Figure 2:
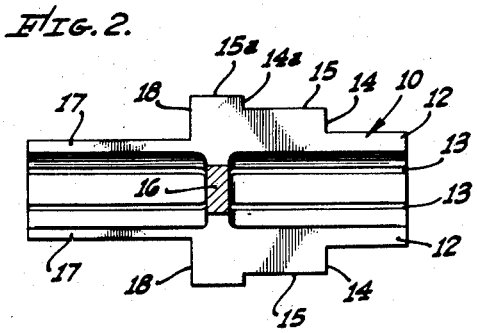
Figure 2 is a sectional view taken along the longitudinal axis of Fig. 1.
Figure 3:
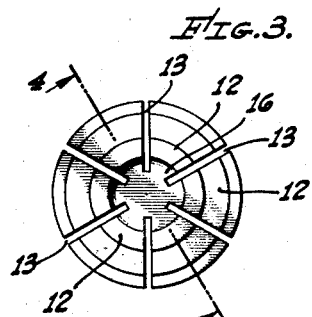
Figure 3 is an end view of the device as seen from the right of Figs. 1 and 2.

Referring now to the drawings and particularly to Figs. 1-4 thereof, the numeral 10 designates a plurality of longitudinal elements or fingers grouped in spaced relation to form a hollow cylinder having a resilient wall or web 16 in its central portion. The portions of the fingers extending forwardly (to the right in Figs. 1-4) from the web 16 are indicated by the numeral 12, and those portions which extend rearwardly from the web are designated by the numeral 17. The fingers 10 are separated by slots 13 and are preferably arcuate on both their inner and outer surfaces, being joined together by the central web 16, into which the slots 13 extend as seen in Fig. 3.

While the arbor may be of uniform diameter throughout its length, I prefer to form the fingers 10 with a series of steps of increasing diameter from their forward extremities to substantially their midpoint or abreast of the web 16. In the drawing I have shown the forward portions 12 as having two additional steps 15 and 15a of increased diameter, with corresponding shoulders 14 and 14a between the steps, and a rear shoulder 18 between step 15a and the rearward finger portions 17. It will be apparent that the number of steps can be varied depending upon the number of sizes of work which the arbor is designed to handle.

The foregoing structure may be easily formed by turning down a piece of solid bar stock to the required dimensions, boring it from each end leaving the solid web 16 in the center, and then milling the slots 13 to form the segments or fingers 10.

Figure 4:
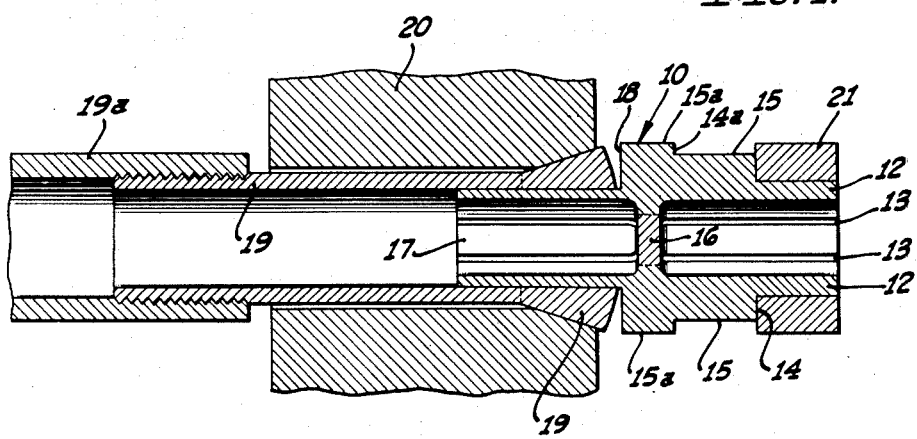
Figure 4 is an enlarged longitudinal section of the arbor of Fig. 1 mounted in a draw collet and holding a work piece, the section being taken at 4—4 in Fig. 3.

In Fig. 4 I have illustrated the arbor of Figs. 1-3 as held in a draw collet 19 carried by a draw bar 19a and slidable in a conventional spindle 20. When the draw bar and collet are pulled inwardly (to the left in Fig. 4) with respect to the spindle the collet 19 is caused to contract around the rear finger portions 17 which because of the slots 13 are also contracted. The web 16 being resilient, contraction of the finger portions 17 causes bending in the web 16 permitting the fingers to pivot about the plane of the web as a fulcrum, thereby causing the forward finger portions 12 to expand radially outwardly to grip the work piece 21 supported thereon. Each finger 10 in effect acts as an independent lever about the fulcrum 16, the action of all of the fingers being the same to thereby uniformly expand the cylinder formed by the fingers and firmly grip and support the workpiece. Since the fingers 10 are resilient they will tend to conform themselves to the inner surface of the workpiece 21; i. e., to flatten out along that portion of their length which engages the workpiece, to provide a maximum area of engagement therewith.

It will be seen that no special tool or shaft need be placed within the arbor to hold it in operative position and that the arbor may be used with chucks and collets of various designs. An operator accustomed to set work in a machine tool can easily gauge the pressure with which he sets the collet or chuck, and as the expansion of the outer finger portions 12 of the arbor is directly related to the pressure in the inner finger portions 17, the force of their grip is under the operator's control at all times. Furthermore either end of the arbor may be inserted in the chuck or used to engage the work, and if desired, the cylinder formed by the rearward finger portions 17 may be of less diameter than that formed by the forward portions 12, thereby forming an additional sized step for holding work when the arbor is reversed.

Figure 5:
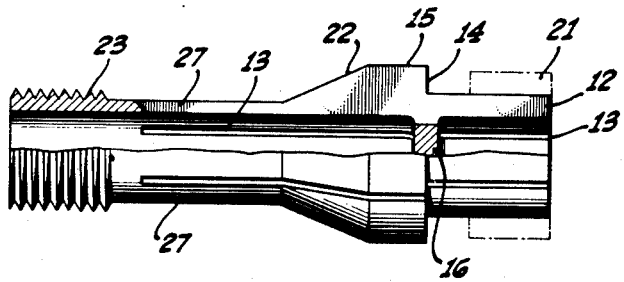
Figure 5 is a longitudinal section with parts shown in elevation of a modified form of my invention in which the arbor is combined with a collet.
Figure 6:
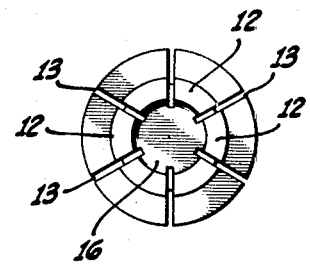
Figure 6 is an end view taken from the right of the embodiment shown in Fig. 5.

In Figs. 5 and 6, I have shown the arbor of my invention combined with a collet of the draw-bar type, the collet forming one piece with the arbor, which thus becomes nonreversible. The forward, or gripping end of the arbor is formed as in my preferred form and may have a similar plurality of steps, although not so shown. Instead of having the rearward shoulder of the largest step cut radially as before, it is formed as a cone 22 sloping rearwardly. In this case the slots 13 do not extend to the rearward extremity of the arbor, but the rearward portions 27 of the fingers merge into a threaded cylinder 23 adapted to engage a draw bar when the arbor is pulled into a conical spindle nose (such as shown in Fig. 4) the compressive force on the conical shoulder 22 causes the inner finger portions 27 to bow inwardly between the threaded portion 23 and the web 16, thus causing the outer finger portions 12 to move radially outwardly about the web 16 as a fulcrum, to grip the workpiece 21 as previously described.

Figure 7:
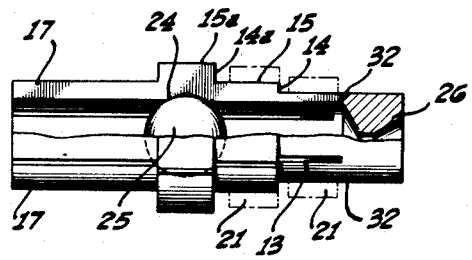
Figure 7 is a longitudinal section with parts shown in elevation of a further modification of my invention.
Figure 8:
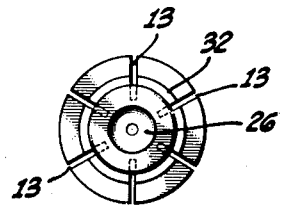
Figure 8 is an end view taken from the right of Fig. 7.
Figure 9:
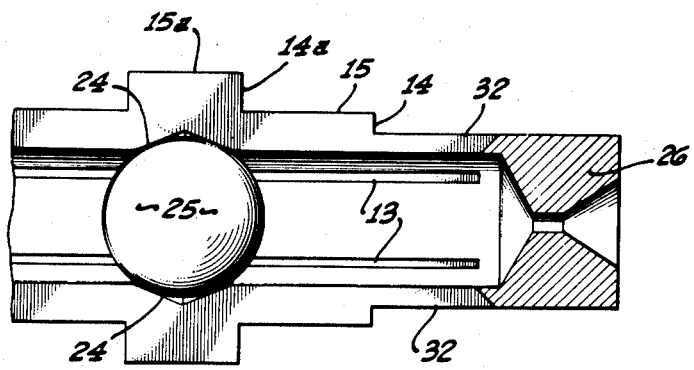
Figure 9 is an enlarged section of a portion of the device shown in Fig. 7.

Another modified form of arbor embodying my invention is illustrated in Figs. 7, 8, and 9. In this form, the forward portions 32 of the fingers are joined by a wall section 26 at their outer or gripping end with the slots 13 terminating just short of said wall section. Adjacent their central portions, the fingers 10 are provided on their internal surface with V-shaped grooves combining to form an annular channel 24 into which a steel ball 25 is pressed from the open rearward end of the arbor to act as a fulcrum. Compression of the rear finger portions 17 in a chuck or collet causes the forward finger portions 32 to bow outwardly in their midsections, with the ball 25 and the wall section 26 serving as fixed end points to the bow. Although in this form of my device the gripping fingers 32 are supported at one end and held fast at the other, it will be observed that there is no wedge or support under their bowed center portions which grip the work, and their grip is therefore resilient as in my other embodiments. It is also apparent that this form of my arbor may also be reversed with the chuck compressing the finger portions 32 thereby causing the free portions 17 to engage a workpiece supported thereon.

While the forms of my invention herein shown and described in detail are fully capable of attaining the objects and providing the advantages hereinbefore stated, it is to be understood that they are merely illustrative of presently preferred embodiments of my invention, and that I do not mean to limit myself to the details of construction of design herein shown, other than as defined in the appended claims.

I claim:

1. An expanding arbor which comprises a plurality of fingers of arcuate cross section resiliently held in spaced parallel relation about a common fulcrum disposed intermediate their ends and forming a substantially complete tubular shell around said fulcrum, whereby radial movement of said fingers on one side of said fulcrum causes reciprocal movement of said fingers on the other side of said fulcrum.

2. An expanding arbor which comprises a plurality of fingers of arcuate transverse cross-section grouped about a common longitudinal axis to form a slotted cylinder, and fulcrum means within said cylinder intermediate its ends engaging said fingers, said fingers being resiliently joined together by a common integral member thereof.

3. An expanding arbor which comprises a plurality of fingers grouped about a common longitudinal axis to form a slotted cylinder having a substantially continuous surface, and fulcrum means within said cylinder intermediate its ends engaging said fingers, said fingers being resiliently joined together at a common transverse section of said cylinder and provided with steps of varying diameter on their outer faces.

4. An expanding arbor which comprises a plurality of fingers of arcuate cross section grouped about a common longitudinal axis to form a slotted cylinder having a substantially continuous surface, and fulcrum means within said cylinder intermediate its ends engaging said fingers, said fingers being resiliently joined together at a common transverse section of said cylinder and provided with a conical shoulder on their outer faces adapted to be wedged into a hollow spindle.

5. An expanding arbor which comprises a cylinder provided with a plurality of longitudinal slots forming a plurality of fingers of arcuate cross-section throughout their length which are resiliently joined together at one point along their length, and means within said cylinder engaging and forming a fulcrum for said fingers, whereby radial movement of said fingers on one side of said fulcrum causes reciprocal movement of said fingers on the other side of said fulcrum.

6. An expanding arbor which comprises a cylinder provided with a plurality of longitudinal slots forming a plurality of fingers joined together at one end thereof, and a ball held within said cylinder acting as a fulcrum for said fingers, whereby radial movement of said fingers on one side of said fulcrum causes reciprocal movement of said fingers on the other side of said fulcrum.

7. An expanding arbor comprising: a plurality of fingers of arcuate cross-section grouped to form a longitudinally slotted cylinder about a common longitudinal axis; fulcrum means common to all of said fingers substantially at their mid-points for holding the said mid-points at fixed radius from said axis; and an annular step formed on said fingers on the exterior of said cylinder in transverse alignment with said means; the said fingers being resiliently joined together by a common integral portion thereof and being adapted to move outwardly on one side of said fulcrum means when compressed inwardly on the other side thereof.

8. An expanding arbor comprising: a hollow cylinder having a plurality of longitudinal slots therein from one end thereof to adjacent the other end thereof forming intervening fingers; a web joining said fingers substantially at the central portion of said cylinder transversely thereof and adapted to hold said fingers in fixed radial spacing from the axis of said cylinder, said fingers being inversely radially movable on either side of said web, a portion of said cylinder at the last-mentioned end thereof annularly joining said fingers, threads on said annularly joining portion; and an annular step formed by said fingers on the exterior of said cylinder in transverse alignment with said web, said step having a radial riser on the side toward the first-mentioned end of said cylinder and a conical riser on the side toward the other end.

9. An expanding arbor comprising: a hollow cylinder having a plurality of longitudinal slots therein co-extensive therewith and forming intervening fingers; a web at one end of said cylinder integral with said fingers and joining them transversely of said cylinder; a groove in the interior of each of said fingers substantially at the midpoint thereof, said grooves collectively forming an interior annular channel in said cylinder; an annular step formed by said fingers on the exterior of said cylinder in transverse alignment with said channel; and a ball held by said channel and forming a fulcrum for said fingers, whereby that portion of said fingers between the joined ends thereof and said ball will be bowed outwardly by inward compression of the free ends of said fingers.

10. An expanding arbor having: a plurality of fingers of arcuate cross-section grouped in a cylindrical grouping; flexible means at one end of said cylindrical grouping and transversely thereof for joining said fingers; an outwardly extending annular step formed by said fingers substantially at the midpoint thereof; an interior annular channel formed by said fingers in transverse alignment with said step; and means held by the said channel adapted to form a pivot for said fingers whereby that portion of said fingers between the joined ends thereof and the last-mentioned means will be bowed outwardly by inward compression of the free ends of said fingers.

WILLIAM K. RIEBER.

REFERENCES CITED

The following references are of record in the file of this patent:

UNITED STATES PATENTS

| Number | Name | Date |
|---|---|---|
| 255,010 | Nicholson | Mar. 14, 1882 |
| 1,164,704 | Courembis | Dec. 21, 1915 |
| 1,348,740 | Reisinger | Aug. 3, 1920 |
| 1,411,292 | Mueller | Apr. 4, 1922 |
| 1,781,721 | Earl | Nov. 18, 1930 |
| 1,827,415 | Bidwell | Oct. 13, 1931 |
| 1,897,228 | Beckett | Feb. 14, 1933 |